United States Patent

Johns et al.

[15] 3,659,586
[45] May 2, 1972

[54] PERCUTANEOUS CARBON DIOXIDE SENSOR AND PROCESS FOR MEASURING PULMONARY EFFICIENCY

[72] Inventors: Richard J. Johns; Richard H. Shepard, both of Baltimore; Wardell J. Lindsay, Columbia, all of Md.

[73] Assignee: The Johns Hopkins University

[22] Filed: May 20, 1969

[21] Appl. No.: 826,189

[52] U.S. Cl. .................. 128/2 E, 128/2.1 E, 128/DIG. 4, 204/195 B
[51] Int. Cl. .................................................. A61b 5/00
[58] Field of Search .................. 128/2, 2.1; 204/195

[56] References Cited

UNITED STATES PATENTS

| 2,755,243 | 7/1956 | Beckman et al. | 204/195 |
| 2,913,386 | 11/1959 | Clark, Jr. | 204/195 |
| 2,943,627 | 7/1960 | Howell | 128/416 |
| 2,969,058 | 1/1961 | Parton | 128/2.1 |
| 3,049,118 | 8/1962 | Arthur et al. | 128/2 |
| 3,188,285 | 6/1965 | Watanabe et al. | 204/195 |
| 3,278,408 | 10/1966 | Leonard et al. | 204/195 |
| 3,325,378 | 6/1967 | Greene et al. | 204/195 X |
| 3,399,667 | 9/1968 | Nishimoto et al. | 128/2 |
| 3,498,289 | 3/1970 | Watanabe et al. | 128/2.1 |
| 3,504,664 | 4/1970 | Haddad | 128/2.1 |

OTHER PUBLICATIONS

Clark, L. C., Annals of the New York Acad. of Sciences, Vol. 102, Art. 1, pp. 29–45, Oct. 31, 1962, Primary Examiner—Richard A. Gaudet
Assistant Examiner—Kyle L. Howell
Attorney—Walter G. Finch

[57] ABSTRACT

A sensing device including a receiving and measuring vessel for determining tissue carbon dioxide of a living body is disclosed. The skin-permeating $CO_2$ gas is directly introduced to a liquid filled cup. A gas-permeable, membrane-faced, pH sensing electrode is in communication with this liquid and indicates continuously the concentration of $CO_2$ on a meter to give a function of effective alveolar ventilation. A lead plate mount adapts to body member contour and functions as a thermal filter mass to reduce fluctuations in the readings. Also, a process is disclosed for measuring pulmonary efficiency through ionic measurement proximate the human skin.

8 Claims, 4 Drawing Figures

Patented May 2, 1972    3,659,586
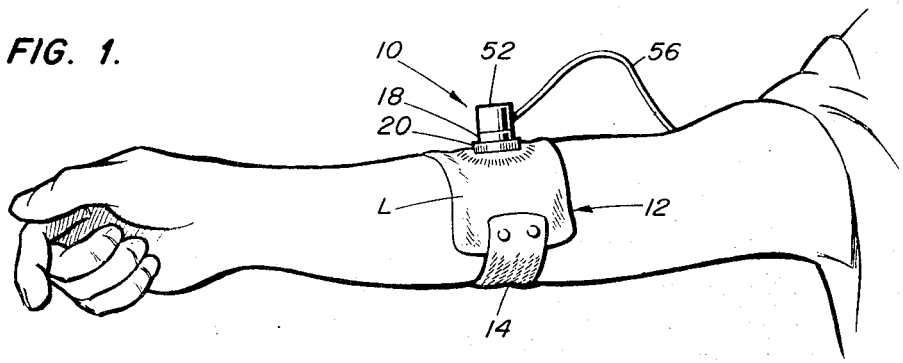
FIG. 1.
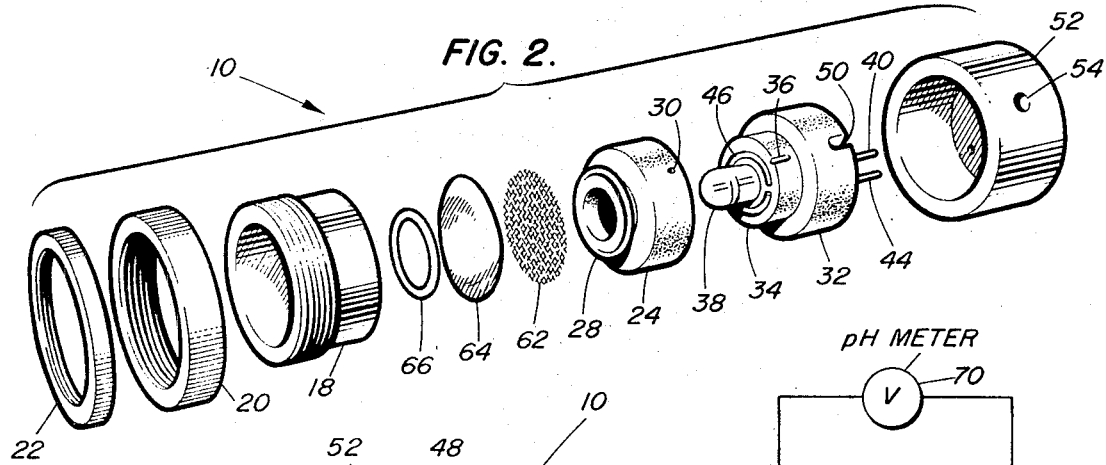
FIG. 2.
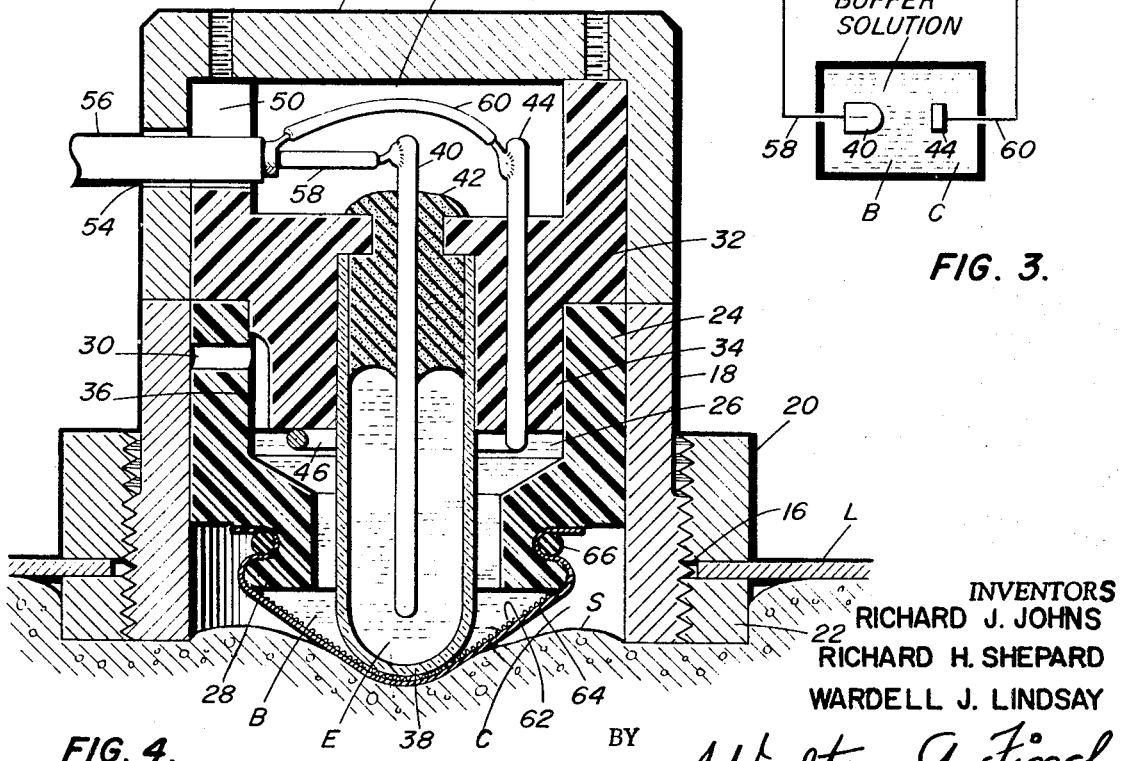
FIG. 3.
FIG. 4.
INVENTORS
RICHARD J. JOHNS
RICHARD H. SHEPARD
WARDELL J. LINDSAY
BY
Walter G. Finch
ATTORNEY

PERCUTANEOUS CARBON DIOXIDE SENSOR AND PROCESS FOR MEASURING PULMONARY EFFICIENCY

This invention relates generally to diagnostic medical apparatus, and more particularly it pertains to a skin-applicable electro-chemical sensor of carbon dioxide.

The measurement of adequacy of pulmonary ventilation is important in monitoring a variety of serious illnesses. Such measurements indicate whether sufficient alveolar efficiency exists in a patient to fulfill his needs. In the past, this factor has been monitored in the blood stream by measuring the pressure of carbon dioxide ($Pco_2$) which is present. Systemic arterial $Pco_2$ closely reflects the alveolar $Pco_2$ which is equal to the ratio of $CO_2$ production of the patient to his effective alveolar ventilation and normally is maintained within narrow limits. If fever or exertion increases the $CO_2$ production, ventilation increases such that the arterial $Pco_2$ remains normal. On the other hand, if ventilation becomes inadequate in the face of a given $CO_2$ production, the arterial $Pco_2$ will rise. The mechanics of arterial blood stream measurement make this a difficult procedure to undertake at frequent intervals over long periods of time.

It is known that tissue $Pco_2$ is approximately 5 mm. Hg higher than that of arterial $Pco_2$ and accurately parallels it as long as tissue blood flow is adequate. Adequacy of blood flow provides no practical problem in monitoring the seriously ill patient for decreased blood flow (which is also important to monitor) increases the tissue $Pco_2$ just as does decreased ventilation.

It is a principal object of this invention, therebefore, to provide a method and apparatus for measuring tissue $Pco_2$ as a means for monitoring adequacy of ventilation of a living body.

Another object of this invention is to provide a $CO_2$ sensor which can conveniently and for long periods of time be applied directly to the skin of a patient without discomfort.

Still another object of this invention is to provide a process for measuring pulmonary efficiency through ionic measurement proximate the human skin whereby the skin-evolved $CO_2$ gas is in proportion to the ratio of $CO_2$ gas production to the effective alveolar ventilation.

Yet another object of the invention is to provide a sampling vessel for directly receiving evolved $CO_2$ and presenting it in a liquid dissolved form to a pH sensing electrode.

Other objects and attendant advantages of this invention will become more readily apparent and understood from the following detailed specification and accompanying drawings in which:

FIG. 1 is a perspective view of the percutaneous $CO_2$ measuring arrangement incorporating features of this invention shown in position on the arm of a subject;

FIG. 2 is an exploded perspective depiction of the sensing head of the measuring arrangement of FIG. 1;

FIG. 3 is a schematic diagram of the electrical circuitry of the sensing head and metering; and FIG. 4 is a vertical section of the percutaneous $CO_2$ measuring arrangement of FIG. 1.

Now, as to the potential use of the sensing device of this invention to be described below, one of the important physical factors to measure in patients, is the adequacy of their breathing. The adequacy of ventilation is quite a separate measure from the amount of air which the patient is either moving in or out of his mouth, or his chest movement, or the amount of oxygen which his body contains. The adequacy of ventilation is best measured by the amount of carbon dioxide in the alveolae of the lungs. The concentration of carbon dioxide in the alveolae of the lungs is the same as the concentration of carbon dioxide in the systemic arterial blood.

For these reasons, the conventional way of assessing the adequacy of ventilation is by measuring the concentration of carbon dioxide in the arterial blood. This involves an arterial puncture and special apparatus to measure the concentration of carbon dioxide. While this is an acceptable and accurate method, it is not suited for the continuous monitoring of carbon dioxide because it means multiple arterial punctures.

For that reason, there is need for a device which will sense the concentration of carbon dioxide continuously. The sensing device of this invention, therefore, measures the carbon dioxide continuously. It measures it instantaneously in the sense that once it comes into equilibrium with the tissue carbon dioxide, it will track it with accuracy. There is an approximate delay time of up to eight (8) minutes in coming from the concentration of carbon dioxide in room air which approaches zero and the carbon dioxide in the tissues which approaches 45 millimeters of mercury.

Now, one point should be made, this is not a device to detect whether or not a person is breathing. There are other simpler ways of determining whether a person is breathing. Thus, this is not proposed as a device to detect a cessation of breathing.

This sensing device of this invention is designed to provide an indication if the breathing of the patient is becoming less adequate or more adequate. This is something which, presently, cannot be easily done.

There are other approaches to monitoring the adequacy of ventilation. One of these is to measure the amount of carbon dioxide which is last to leave the lungs on each breath. This is what is known as the "End Tidal Sampling Method." This has a number of disadvantages, based on the fact that it must be assumed that the $Pco_2$ of the last gas expired is representative of that in alveolar gas. In many conditions where monitoring is necessary, this assumption is not valid and the error produced thereby is in the wrong direction, that is, in a direction to cause underestimation of the seriousness of the condition being monitored.

This is inconvenient in the sense that the patient must wear some sort of mask device; and secondly, it is subject to certain errors. The present sensing device then, measures tissue $Pco_2$ it does not measure arterial $Pco_2$. Tissue $Pco_2$ is an accurate reflection of arterial $Pco_2$ in most circumstances. There is, however, one important exception to this. This exception occurs when the blood supply to the tissue is inadequate. When the blood supply to a tissue is inadequate, the tissue $Pco_2$ makes a rise to abnormally high levels. This is not to be considered a disadvantage to this system for the following reasons. First, the signal produced by such an event is in the direction which causes alarm. That is to say, an increase in $Pco_2$ is what occurs when the ventilation of a person is failing. Second, there is need for a sensing device which will sense inadequacy of circulation to the tissues. That is to say, in the monitoring situation, if one has either failure of respiration or failure of the circulation, it is important that these facts be noted.

This sensing device is designed for sensing $Pco_2$ in tissues. It is not only applicable to the skin, but also to sensing $Pco_2$ through the mucous membranes as, for example, on the tongue. This device does not require either thermostatic or temperature compensation for only one reason. That is, that it has been designed to be in good thermal contact with the skin which is not subject to wide swings in temperature.

To be sure, one can improve the absolute accuracy of the sensing device with the addition of thermostatic compensation; but the error induced by the minor variations in temperature are not contributory to any error in the system.

This is a monitoring device and it is not designed primarily for very accurate measurements of partial pressure of carbon dioxide. This device can be easily adapted to the measurement of the oxygen concentration by using a Clark-type polargraphic electrode for sensing oxygen, rather than using a Severinghaus-type electrode for measuring carbon dioxide.

Now, there does come a problem here. This is the significance of the measurement of the oxygen content of the tissue. Unlike the carbon dioxide content, the oxygen content may vary quite widely owing to the changes in tissue consumption of oxygen. Furthermore, oxygen is considerably less diffusible than $CO_2$, so that one would anticipate greater time lags if one is using this as a measure of tissue oxygen as opposed to tissue carbon dioxide.

As shown in the drawings, there is provided within the interior of the sensing head of sensor 10 of this invention a glass electrode which serves to measure pH. This sensor 10 consists of a hemisphere 38 of pH sensitive glass containing a silver chloride-coated silver wire electrode 40 and an electrolyte E. Cement 42 both seals in the electrolyte E and mounts the wire electrode 40 centrally. The base of the hemisphere 38 is encompassed by a ring 46 formed on the end portion of a reference electrode 44, also of silver chloride-coated silver wire.

The hemisphere 38 and ring 46 are assembled on a cylindrical base 32 with the terminals of both electrodes 40 and 44 protruding into a rear chamber 48. The hemisphere 38 extends forwardly from a reduced diameter portion 34 of the base 32.

A metallic cap 52 is press-fitted over the base 32. Conductors 58 and 60 are brought out through a hole 54 and slot 50 from the electrodes 40 and 44 in the rear chamber 48 for connection through a cable 56 to a pH meter-recorder 70, well known in the art.

Another cylinder 24 of the same outer diameter as the base 32 is provided to fit friction-tight at one end onto the reduced diameter portion 34 of the base 32 and it is internally machined at the other end with a clearance bore to provide a small cavity 26 surrounding the hemisphere 38. The forward end of this cavity 26 is open and the cylinder 24 is externally reduced at this end and machined to a rounded, outwardly extending flange 28.

This cavity 26 is then closed at the forward end with a thin membrane 64 of gas-permeable but not liquid permeable material, such as teflon or silastic in very close apposition to the hemisphere 38, and backed on the cavity side by a thin disc of bibulous material 62, such as nylon mesh or cellophane. A rubber band or O-ring 66 serves to hold the edges of the membrane 64 tensioned over the flange 28 and the hemispherical glass electrode 38.

This cavity 26 is then filled with a saline or buffer solution B. Cylinder 32 together with the glass electrode 38 and reference electrode 44, 46 is then inserted into the liquid-filled cavity 26. It will be noted that a small hole 30 is bored through the upper wall of this cylinder 24 and the other cylinder 32 cut away at reference 36 in register to form a connecting passage communicating from the exterior through hole 30 and cut-away 36 to the cavity 26. Through this passage the displaced fluid escapes during insertion of cylinder 32 into cylinder 24. After insertion, the cylinders 24 and 32 are rotated in relationship to one another such that hole 30 is not in register with passage 36. Cavity 26 is thereby sealed from the exterior.

The skin of the patient is prepared to render it permeable to the carbon dioxide by first degreasing it with ether or acetone. Then the barrier layer of dry scale is removed mechanically with the aid of pressure-sensitive tape.

A harness or mount 12 comprises an apertured lead plate L and an elastic strap 14. An externally threaded metal sleeve 18, which is provided for press fit about the cylinder 24, is mounted in the aperture 16 and secured by lock nuts 20 and 22. The malleable lead base plate L is formed to the contour of the body member of the subject and secured with the strap 14 thereon. The sensing head of sensor 10 is then positioned over the prepared skin area. This forms a well in which the skin is the bottom. Water or a saline solution C is introduced into this well and the sensor head of sensor 10 is inserted into sleeve 18 in the lead plate L.

The membrane 64 can be brought into gentle apposition with the skin surface S by proper selection of the slight projection of the glass electrode 38 beyond the sleeve 18. Heavy pressure is to be avoided since it may deform or damage the glass hemisphere 38. Any clearance between the membrane 64 and the skin results in slow response to $CO_2$ changes.

Thus, the gas in the tissue of the subject can diffuse freely through the skin, through the thin film of water or saline C, through the membrane 64, and through buffer liquid B, into the inner cavity 26 where it affects the pH measuring cell arrangement, mentioned above to register on the pH meter-recorder 70. Since the only gas present in tissue which affects pH is carbon dioxide, this device will percutaneously measure and monitor the tissue concentration of carbon dioxide. Since pH sensing heads of this type are quite temperature sensitive, the lead plate L not only provides thermal coupling of body temperature from the arm of the subject, but also functions as a thermal filter mass to prevent rapid fluctuations which might otherwise occur due to air currents and for other reasons.

Obviously many modifications and variations of the present invention are possible in light of the above teachings. It is, therefore, to be understood that within the scope of the appended claims the invention may be practiced otherwise than as specifically described.

We claim:

1. A percutaneous carbon dioxide sensor system for determining tissue $CO_2$ gas of a living body, comprising, a receiving and measuring vessel having an opening therethrough extending from a first surface of said vessel to a second surface thereof, a gas-permeable liquid-impermeable membrane detachably attached within and across said opening at an intermediate portion thereof, the position of said membrane within said opening defining a first chamber which includes the portion of said opening extending between said membrane and said first vessel surface and defining second chamber which includes the portion of said opening extending between said membrane and said second vessel surface, said membrane attached within said opening to preclude liquid flow between said first and second chambers, means adapted for mounting said vessel to a skin area of a living body to locate said first vessel surface in intimate contact with said skin area to enclose said first chamber between said membrane and said skin area, said membrane being detachably mounted within said opening to permit the depositing of a $CO_2$ gas-permeable liquid into the portion of the opening defining the first chamber prior to the attachment of the membrane within the opening and subsequent to the mounting of the vessel to the skin area, said second chamber having a buffer solution deposited therein subsequent to the attachment of said membrane within said opening, a pH sensing electrode having at least a portion thereof, mounted and positioned within said second chamber so that said electrode is immersed in said buffer solution, a reference electrode having at least portions mounted and positioned within said second chamber adjacent to the portion of the pH sensing electrode which is positioned within said second chamber so that both electrodes are immersed in the buffer solution, a pH meter-recorder, circuit means for connecting said electrodes to said pH meter-recorder, whereby said pH meter-recorder indicates continuously the concentration of tissue $CO_2$ gas to give a function of effective alveolar ventilation of said living body, and thermal sink means attached to exterior portions of said vessel in heat conductive relationship therewith for minimization of temperature changes of said pH electrode.

2. A percutaneous carbon dioxide sensor system as recited in claim 1, wherein said mounting means is a conformable strap-like member secured to said vessel and adapted to be fastened about a portion of a living body whereby said vessel is positioned over an adjacent skin area of the living body.

3. A percutaneous carbon dioxide sensor system as recited in claim 33, wherein said thermal sink means is a lead sheet attached to exterior portions of said vessel and adapted to be mounted to portions of the living body adjacent the skin area to dissipate heat generated by the living body and resulting from surrounding air currents.

4. A percutaneous carbon dioxide sensor system as recited in claim 1, wherein said pH sensing electrode induces a pH sensitive glass tube, an electrolyte contained within said tube and a silver chloride-coated silver wire having one end portion immersed within said electrolyte and the other end portion connected through said circuit means to said pH meter-recorder.

5. A percutaneous carbon dioxide sensor system as recited in claim 1, wherein said vessel further comprises, open means communicating with said second chamber for permitting excess buffer solution to flow outwardly from within said second chamber as said pH sensing electrode and said reference electrode are immersed into said buffer solution and means for sealing said open means after the excess buffer solution has flowed out of said second chamber.

6. A percutaneous carbon dioxide sensor system as recited in claim 1, wherein said pH sensing electrode is positioned within said second chamber to such a depth that an end portion of said sensing electrode urges and holds a portion of said membrane in engagement with adjacent portions of the skin area over which said vessel is mounted.

7. A percutaneous carbon dioxide sensor system as recited in claim 6, and additionally a disc of bibulous material interposed between the surface of said membrane within said second chamber and said end portion of said pH sensing electrode.

8. A process for measuring pulmonary efficiency wherein a measurement is effected of the skin permeating $CO_2$ gas which is in proportion to the ratio of $CO_2$ gas production to the effective alveolar ventilation, comprising, preparing the skin of a living person to render it permeable to $CO_2$ gas, confining a volume of gas-permeable liquid in intimate contact with said prepared skin area, confining a volume of buffer solution separated from said gas-permeable liquid by a gas-permeable membrane whereby $CO_2$ gas is permitted to permeate the skin, the gas-permeable liquid, the membrane and into the buffer solution to change the pH thereof and detecting and measuring the pH changes.

* * * * *

UNITED STATES PATENT OFFICE
CERTIFICATE OF CORRECTION

Patent No. 3,659,586         Dated May 2, 1972

Inventor(s) Richard J. Johns et al

It is certified that error appears in the above-identified patent and that said Letters Patent are hereby corrected as shown below:

Column 1, line 30 "Therebefore" should read -- therefore --. Column 4, line 64, "33" should read -- 1 --.

Signed and sealed this 7th day of November 1972.

(SEAL)
Attest:

EDWARD M. FLETCHER, JR.          ROBERT GOTTSCHALK
Attesting Officer                 Commissioner of Patents